July 8, 1952  J. E. WILCOCK  2,602,269
METHOD OF AND APPARATUS FOR FORMING UNDERCUT
SOCKETS IN A MATERIAL IN A HOT PLASTIC STATE
Filed Feb. 18, 1947  2 SHEETS—SHEET 2
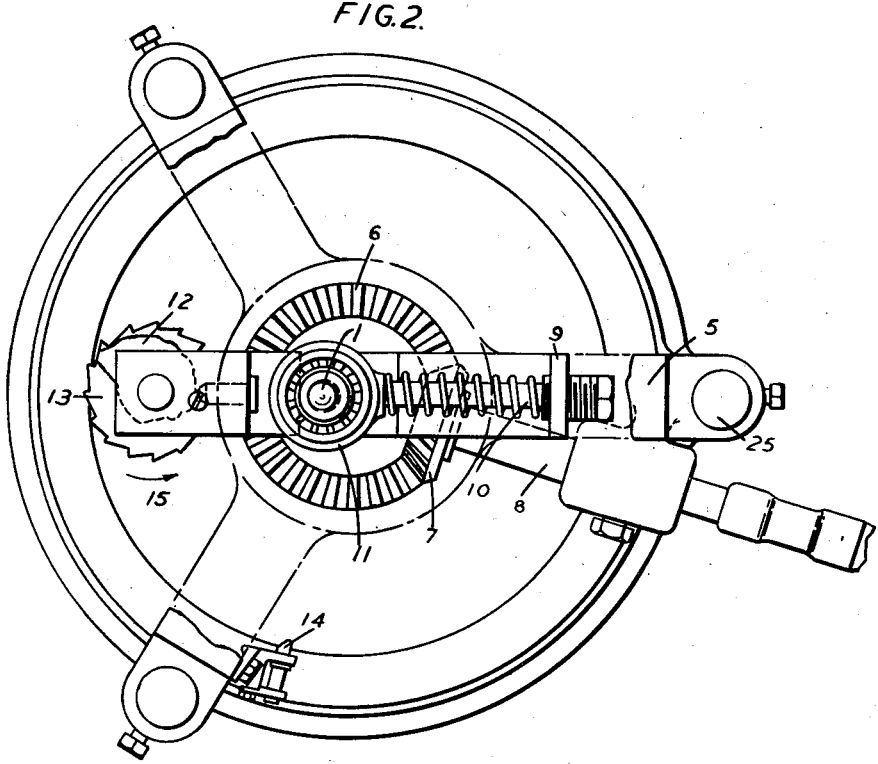
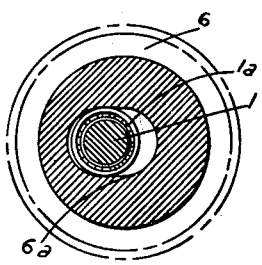
John Edward Wilcock
Inventor,
by Morrison, Kennedy & Campbell,
Attorneys Patented July 8, 1952

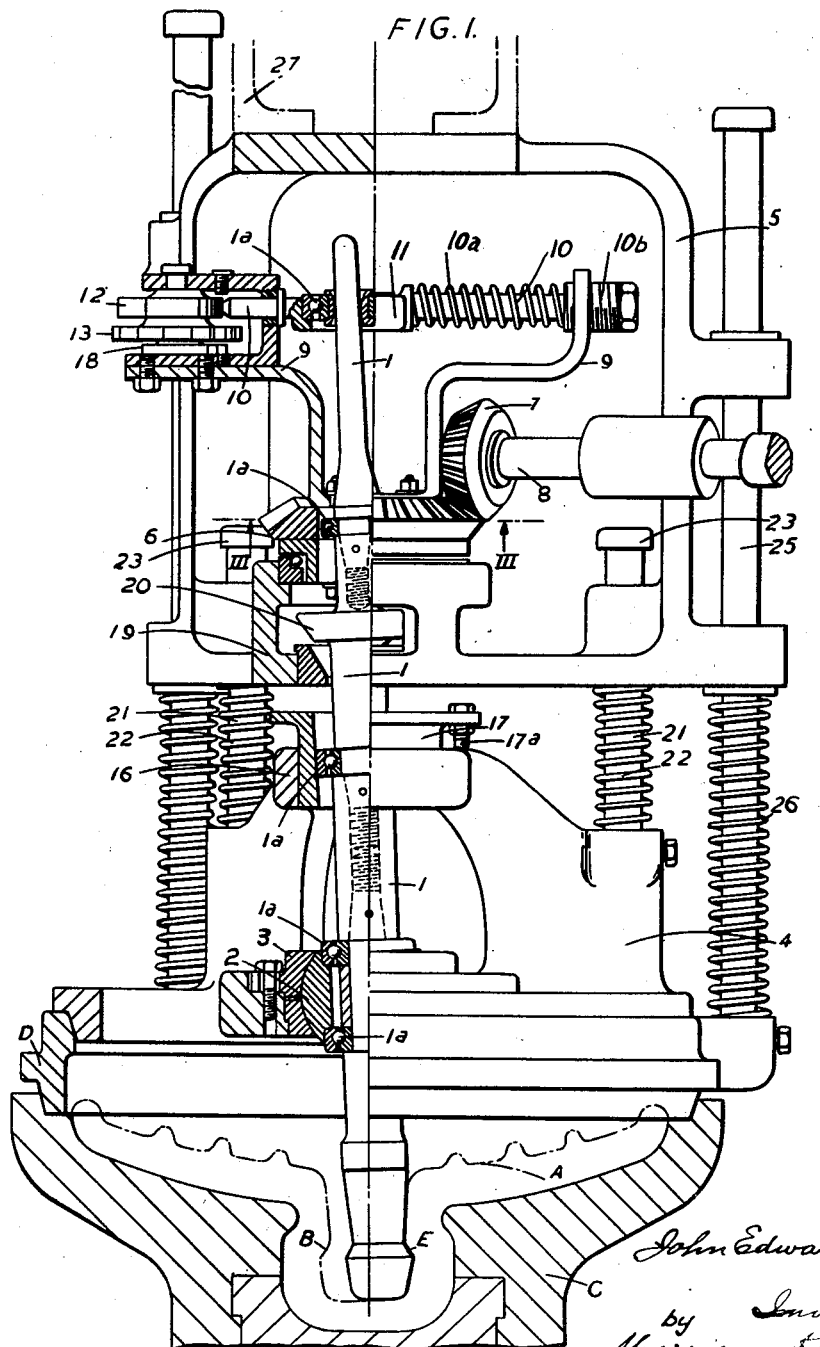

2,602,269

UNITED STATES PATENT OFFICE 2,602,269

METHOD OF AND APPARATUS FOR FORMING UNDERCUT SOCKETS IN A MATERIAL IN A HOT PLASTIC STATE

John Edward Wilcock, St. Helens, England, assignor to Pilkington Brothers Limited, Liverpool, England, a British company Application February 18, 1947, Serial No. 729,332
In Great Britain July 13, 1945

Section 1, Public Law 690, August 8, 1946
Patent expires July 13, 1965

10 Claims. (Cl. 49—22)

This invention relates to methods of and apparatus for forming undercut sockets in a glass body in a hot plastic state.

In the manufacture of high voltage glass insulators, the glass is moulded between two complemental moulding members to give the desired dished plate form to the glass and centrally of the plate a deep socket. The socket has tapered walls which are slightly wider at the mouth than at the base, to facilitate separation of the moulding members.

To complete the insulator a steel pin is cemented into the socket, and to form a load bearing shoulder in the socket, and to interlock the pin and socket, when the cement is packed in the socket about the pin, the socket is widened below the mouth to convert the tapered socket into an undercut socket thus providing a load bearing shoulder just below the mouth.

This outward deformation of the socket wall below the mouth has heretofore been effected by a hand operation, using a forming stick the forming end of which is rotated in a more or less circular path while being pressed radially against the glass. The process of deformation can be regulated by the operator only by his applying a pressure against the glass which is not so great as to cause folds in the glass and yet is great enough to complete the operation before the glass has cooled to a point where deformation is difficult.

However skilled the operator may be in applying a definite and constant pressure, the process gives unsatisfactory results by reason of the inevitable variations in the temperature of the glass. Such temperature variations call for corresponding variations in the pressure, and these cannot be estimated by the operator.

The main object of the invention is to effect the formation of the socket wall by a predetermined rate of deformation, instead of by application of a predetermined pressure.

Another main object of the present invention is to provide automatic means of controlling the movements of a forming stick, whereby malformations in undercut sockets of glass insulators is avoided, and a standard form of product produced.

A further main object of the present invention is to devise apparatus whereby the forming end of a forming stick may be inserted into the socket of the insulator and automatically rotated therein in predetermined circular paths of gradually increasing radii, while it is enabled to make rolling contact on the walls of the socket by rotation on its own axis the path for the forming end of the stick being predetermined so that the rate of increase of radius permits deforming without causing folds, which would result from excessive penetration or ploughing of the forming stick into the glass, whilst the rolling contact avoids the ultimate formation of cracks or crizzles which would otherwise result from the stick sliding over the glass.

A method of deforming a socket formed in a glass body in a hot plastic state, according to the present invention, consists in inserting a forming stick into the socket and then moving its centre line in a predetermined path of progressively increasing radii while the stick is freely rotated about its centre line by the rolling contact of the stick with the walls of the socket, whereby the socket is converted to undercut form.

The present invention also comprises a method of producing from a high voltage glass insulator of dished plate form and having a tapered socket, an insulator having a deformed socket providing a load carrying shoulder therein, comprising the step of rolling a deforming member on the inner wall of the tapered socket whilst at about the temperature of formation, and after each circuit of the inner wall, outwardly moving the deforming member to a precisely limited degree which is acceptable by the glass without skidding or ploughing, whereby the socket is gradually undercut by a succession of circuits of the deforming member in concentric circular paths of prescribed radii, and the load carrying shoulder thereby progressively produced.

Apparatus for forming an undercut socket in a glass body in a hot plastic state, according to the present invention, comprises a forming stick free to turn on its own axis, means for disposing the stick coaxially of the socket, means for progressively displacing the stick away from coaxiality with the socket, and means for simultaneously imparting to the stick a circular motion about the axis of the socket.

In accordance with the invention apparatus for forming an undercut socket in a glass body in a hot plastic state is characterised by a forming stick supported in a universal bearing and free to turn about its own axis, a member adapted to be rotated about the axis of the socket, a movable piece mounted on the rotatable member and engaging said stick, whereby the latter is adapted to move the forming stick progressively from the centre line of the socket outwardly, and means for moving the said piece relatively to the rotatable member during the atter's rotation whereby the forming end of the stick is moved in predetermined concentric circular paths of increasing radii in rolling contact with the walls of the socket.

In preferred constructions according to the present invention the rotary movement of the stick about the centre of the universal bearing is effected by a rotatable member provided with a diametrical slot through which the stick passes, in combination with means for moving the stick along the slot during the rotation of said member, whereby the stick is progressively tilted by predetermined and successive increments from the vertical at each revolution of the rotatable member.

As hereafter more particularly pointed out the rotatable member is preferably in the form of a toothed wheel and the movable piece is a sliding member conveniently in the form of a spring pressed plunger.

A preferred form of apparatus according to the invention comprises a stick, mounted in a universal bearing disposed near one end of the stick adapted to enter the socket, a toothed member slotted diametrically mounted for rotation about the axis of the stick, whereby the stick, when tilted from the vertical, may be moved in a circular path about the centre of the bearing, and resilient means operating on that part of the stick which is on the other side of the toothed member to the universal bearing for progressively increasing the tilt of the stick by predetermined increments actuated synchronously with each revolution of the toothed member, and antifriction means between the stick and the bearing, the toothed member, and resilient operating means, whereby the stick may be rotated on its own axis by engagement of the end near the bearing on the plastic wall of the socket.

The mounting of the toothed member may comprise a conical seating and the stick may carry a conical element which when engaged on the seating disposes the stick in vertical position, the seating being movable vertically to free the stick for the tilting operation.

Socket deforming apparatus according to the invention is preferably incorporated in a machine for pressing the glass insulator from a gob.

In order that the invention may be more clearly understood preferred embodiments thereof will now be described with reference to the accompanying drawings in which:

Figure 1 is an elevation.

Figure 2 is a plan, and

Figure 3 is a sectional plan on the line III—III of Figure 1.

In the drawings like references designate the same or similar parts.

An insulator A of dished plate form having a socket B manufactured from glass and in a hot plastic state is shown in chain lines in Figure 1, lying in a bottom mould C, and a locating or cushioning ring D for the stick operating apparatus is shown disposed on the mould.

Following the pressing operation in the mould the socket wall is tapered and inclines inwardly from the mouth of the socket to the base thereof, and the deforming operation to be performed produces the shoulder E.

In the drawing the stick 1 is shown in the inclined position it attains at the end of the deforming operation, and it will be appreciated that the configuration of the bottom end of the stick is determined by ultimate cross section required for the wall of the socket.

The stick 1 is, near the end, adapted to enter the socket, i. e. the forming end, mounted in the ball 2 of a universal bearing 3 carried in a frame 4 which is the lower cage part of the apparatus illustrated, of which the upper cage part is the frame 5.

The upper cage part carries a bevel gear 6 which is slotted diametrically as clearly indicated at 6a in Figure 3. The gear 6 is driven by bevel gear 7 on a shaft 8 carried on the frame 5 and driven by any suitable motor. Accordingly as the gear 6 rotates the stick is rotated about the centre of the ball 2 as soon as the stick is deflected from a vertical position.

On the bevel gear 6 is fixed a bracket 9 which carries the means for progressively deflecting the stick 1 by equal increments, and which comprises a spring pressed plunger 10 having an eye 11 through which passes the upper end of the stick 1, the plunger bearing on the profile of a cam 12 having a vertical axis member carried by the bracket, and the cam being of snail form as clearly shown in Figure 2.

The spring 10a bearing against a nut 10b maintains the plunger 10 in contact with the cam 12 in normal operation, so that the path of the forming end of the stick is determined by the cam.

Connected to the cam 12 is a coaxial ratchet 13, and on the upper cage part 5 is a pawl 14, as clearly shown in Figure 2, so that for each revolution of the gear 6, the ratchet 13, being carried on the gear 6 by the bracket 9, strikes the pawl 14 causing it to move one step, which angular movement is imparted to the cam 12 in the direction of the arrow 15 (see Figure 2) thereby permitting a restricted longitudinal movement of the plunger 10 and a tilt of the stick 1 corresponding to the difference in the radii of the steps on the cam profile.

From the foregoing it will be observed that the forming end of the stick makes one complete circuit of the socket wall before a radial movement of the stick is permitted by the cam 12, and that the radial movement is precisely regulated by the height of the step. The cam is designed to permit a radial movement of the forming end of the stick at a time and to an extent that the glass is ready to accept it.

The frame 4 carries in its upper part a boss 16 in which is mounted a bush 17 which is adjustable axially with regard to the boss by means of threaded members 17a mounted in the collar of the bush, and bearing on the boss 16. The inner face of the bush 17 is tapered and acts as an adjustable stop which predetermines the maximum tilt of the stick 1.

From the foregoing it will be observed that rotation of the gear 6 causes the progressive tilting of the stick 1 and its continuous rotation until the bush 17 arrests further radial movement of the stick.

The stick, being deflected from the vertical, is engaged by the walls of the slot 6a of the bevel gear 6 and the stick is rotated with the gear about the centre of the ball 2 and the shaped bottom end operating in the socket B of the insulator A deforms the socket to provide the load carrying shoulder E.

As clearly shown in Figure 1 a ball race 1a is interposed between the stick and every bearing surface which coacts with the stick, it is thus made sufficiently free from friction with the cooperating parts to allow the bottom or forming end of the stick by frictional contact with the plastic glass, to achieve a true rolling motion on the glass, thereby avoiding cracks, crizzles or folds, and since the radial motion of the stick is at all times positively controlled by the plunger 10 and cam 12 it is impossible for the stick to plough into the plastic glass.

Below the ratchet 13 is a clock spring 18 connected to the bracket 9 and to the ratchet, the arrangement being such that as the cam is rotated to increase the angle of tilt of the stick 1, the spring is wound up. So long as the plunger 10 is pressed against the cam, the clock spring 18 is unable to turn the cam reversely, but when the stick is centralized, as will now be explained, the pressure of the plunger is released, and the clock spring then returns the cam to its starting position.

On the frame 5 is a conical seating 19 coaxial with the gear 6 and on the stick is a conical collar 20. When the collar 20 is free of the seating a deforming operation can be performed but when it is engaged by the seating the stick is centralised and can be rapidly withdrawn or inserted in the tapered socket of a high tension glass insulator in a plastic state without searing the glass at the narrow neck of the socket.

As clearly shown in Figure 1 the lower cage part 4 carries vertically disposed rods 21 on which are springs 22 which always tend to separate the upper cage part 5 from the lower cage part 4, and heads 23 on the rods limit the separation.

As the cage parts are lowered the lower part 4 engages the locating ring D resting on the mould C and is then arrested, but the upper part 5 continues to descend further compressing the springs 22, and displacing the seating 19 from the collar 20 so that the stick can be tilted. When the cage parts are raised the upper part 5 first moves accompanied by the extension of the springs 22 and the seating 19 engages the collar 20 so that the stick is centralised before it is retracted from the socket B.

The locating ring D is provided with rods 25 which act as guides for the frame 5, and springs 26 on these rods assist the springs 22 on the rods 21 in resiliently supporting the frame 5 when in operative position.

When the apparatus disclosed, is arranged at a station on a machine for pressing the insulator from a gob, the frame 5 may be provided with an air cylinder as indicated at 27 and thereby operated in the same way and in synchronism with the usual pressing upper mould part, and the lower moulds such as C will then be mounted in a table rotated step by step in known manner to bring each mould successively to the gob feeding, pressing, socket-deforming, and cooling stations.

Thereby a high tension glass insulator may be produced ready for the insertion of the usual steel pin by entirely automatic means, and a standard product produced. However, the apparatus herein described may be comprised in an individual machine and a hot pressing transferred in the usual manner to a mould C comprised in the machine and the parts 4, 5 may be moved mechanically e. g. by hand lever or by compressed air, operating e. g. in cylinder 27 as will be well understood by those skilled in the machine building art.

By employing a mechanically driven driving member which positively controls rotation of the stick the latter is always driven with a constant effort and the rate of deformation of the glass is regulated at all times so as to prevent ploughing in the glass and skidding is avoided by enabling the stick to make rolling contact with the glass. Moreover the stick is operated when the glass is at a temperature for the glass which is practically speaking the temperature of pressing, thereby the formation of the load carrying shoulder is effected under optimum conditions.

From the foregoing, it will be observed that the present invention includes a method of producing a high voltage glass insulator having a deformed socket providing a load carrying shoulder therein, which comprises the step of rolling a deforming member on the inner wall of the socket whilst at about the temperature of pressing, which is characterised in that after each circuit of the inner wall the deforming member is outwardly moved to a precisely limited degree which is acceptable by the glass without ploughing, whereby the socket is gradually deformed by a succession of circuits of the deforming member in concentric circular paths of prescribed radii.

By the present invention high voltage glass insulators of standard form can be produced, in particular having a deformed socket of accurately dimensioned form, thereby facilitating the assembly of the usual steel pins in the sockets of the insulators.

I claim:

1. Apparatus for forming an undercut socket in a glass body in a hot plastic state comprising a forming stick, a universal bearing supporting the stick for simultaneous gyratory motion about the axis of the socket and rotation about the axis of the stick, means for disposing the stick coaxially of the socket at the beginning of a forming operation, means for imparting to the stick a gyratory motion about the axis of the socket, means for simultaneously progressively tilting the stick away from co-axiality with the socket and means consisting of anti-friction bearing means journalling the stick for rolling contact with, and for free rotation on its axis by, the walls of the socket during gyratory motion of the stick.

2. Apparatus for forming an undercut in a glass body in a hot plastic state comprising a forming stick, a universal joint supporting the stick for simultaneous gyratory motion about the axis of the socket and rotation about the axis of the stick, means for imparting to the stick a gyratory motion about the axis of the socket, and linearly movable means for tilting the stick relative to the socket and control means coactive with said linearly movable means to cause said linearly movable means to tilt the stick successive predetermined increments outwardly from the axis of the socket on successive gyrations whereby the forming end of the stick is moved in circular paths of increasing radii in rolling contact with the walls of the socket.

3. Apparatus for forming an undercut socket in a glass body in hot plastic state comprising a forming stick, a universal bearing supporting the stick for simultaneous gyratory motion about the axis of the socket and rotation about the axis of the stick, a rotary member adapted to rotate about the axis of the socket, means for rotating said member, means movably mounted on the rotary member adapted to tilt the stick, means for progressively moving said movably mounted means relative to the rotary member step by step, one step for each rotation of said member, to tilt the stick and means for simultaneously imparting to the stick a gyratory motion about the axis of the socket, whereby the forming end of the stick is moved in predetermined concentric circular paths of increasing radii in contact with the walls of the socket, and means consisting of anti-friction bearing means journalling the stick for rolling contact with, and for free rotation on its axis by, the walls of the socket.

4. Apparatus for forming an undercut socket in a glass body in a hot plastic state comprising a forming stick, means including a universal bearing to support the forming stick for free rotation about its own axis, means for disposing the stick co-axially of a socket, a rotatable member having a diametrical slot through which the stick passes, means for rotating said rotatable member and means movably mounted on said rotatable member for moving the stick along said slot during rotation of the rotatable member to progressively tilt said stick about the centre of the universal bearing by predetermined and successive increments outwardly from the axis of the socket on successive revolutions of the rotatable member, whereby the stick is given a gyratory motion and the forming end thereof is moved in concentric circular paths of increasing radii in rolling contact with the walls of the socket.

5. Apparatus for forming an undercut socket in a glass body in a hot plastic state comprising a forming stick, a universal bearing to support the forming stick for free rotation about its own axis, a rotatable member mounted for rotation about the axis of a socket and having a diametrical slot through which the stick passes, means for rotating said rotatable member, a movable piece engaging said stick and mounted for rotation with the rotatable member, and means for moving said movable piece relatively to the rotatable member during rotation of said member to tilt said forming stick about the center of the universal bearing successive predetermined increments outwardly from the axis of the socket on successive revolutions of the rotatable member, whereby the stick is given a gyratory motion and the forming end thereof is moved about the centre of the universal bearing in predetermined concentric circular paths of increasing radii in rolling contact with the walls of a socket.

6. Apparatus for forming an undercut socket in a glass body in a hot plastic state comprising a forming stick, a universal bearing to support the stick near the end thereof adapted to enter a socket, anti-friction means between the stick and the bearing to permit free rotation of the stick about its own axis, a rotatable toothed member mounted for rotation about the axis of a socket and having a diametrical slot through which the stick passes, and resilient means operable synchronously with the toothed member and on that part of the stick which is on the other side of the toothed member to the universal bearing progressively to tilt the stick about the centre of the bearing by predetermined increments.

7. Apparatus for forming an undercut socket in a glass body in a hot plastic state comprising a forming stick, a universal bearing to support the stick near the end thereof adapted to enter a socket, anti-friction means between the stick and the bearing to permit free rotation of the stick about its own axis, a rotatable toothed member mounted for rotation about the axis of a socket and having a diametrical slot through which the stick passes, a mounting for the toothed member including a conical seating, a conical element on the forming stick to engage with said conical seating and dispose the stick in vertical position, means to move the mounting vertically to disengage the seating from said conical element and thereby to free the forming stick for a forming operation, and resilient means operable synchronously with the toothed member and on that part of the stick which is on the other side of the toothed member to the universal bearing progressively to tilt the stick about the centre of the bearing by predetermined increments.

8. Apparatus for forming an undercut socket in a glass body in a hot plastic state comprising a forming stick, a universal bearing to support the stick near the end thereof adapted to enter a socket, anti-friction means between the stick and the bearing to permit free rotation of the stick about its own axis, a rotatable toothed member mounted for rotation about the axis of a socket and having a diametrical slot through which the stick passes, a mounting for the toothed member including a conical seating, a conical element on the forming stick to engage with said conical seating and dispose the stick in vertical position, means to move the mounting vertically to disengage the seating from said conical element and thereby to free the forming stick for a forming operation, a plunger provided with an eye through which passes the upper end of the forming stick, anti-friction means between the stick and the plunger to permit free rotation of the stick about its own axis, a stepped cam engaging the plunger and mounted for movement with the toothed member about the axis of said toothed member and for rotation about its own axis, a rotatable ratchet wheel to rotate said cam about its axis from a starting position, a pawl to rotate the ratchet wheel one step for each revolution of the toothed member to tilt the stick about the centre of the bearing by predetermined increments, and means to restore the cam to starting position on engagement of said conical element and conical seating.

9. A method of undercutting a socket in a glass body while in hot plastic state, comprising the steps of inserting into the socket the forming end of a forming stick, gyrating the stick about the axis of the socket with the forming end of the stick in free rolling contact with the walls of the socket during a succession of circuits, and with the stick freely rotating about its axis due to such rolling contact of the forming end with the walls of the socket, and progressively increasing the radius of movement of the forming end in rolling contact with the walls of the socket by successive predetermined radial increments upon successive circuits until the desired undercutting of the socket has been effected.

10. A method of undercutting a tapered socket in a dished plate form of high voltage glass insulator to provide a load carrying shoulder in the socket while the insulator is in hot plastic state, comprising inserting into the socket the forming end of a forming stick, gyrating the stick about the axis of the socket with the forming end of the stick in free rolling contact with the walls of the socket during a succession of circuits, and with the stick freely rotating about its axis due to such rolling contact of the forming end with the walls of the socket, and after each such circuit increasing the radius of movement of the forming end of the stick by a predetermined radial increment such as is acceptable to the plastic glass of the walls of the socket without skidding thereon or ploughing thereof by the forming end of the stick, whereby a load carrying shoulder in the socket is gradually produced.

JOHN EDWARD WILCOCK.

(References on following page)

REFERENCES CITED

The following references are of record in the file of this patent:

UNITED STATES PATENTS

| Number | Name | Date |
|---|---|---|
| 650,433 | Stewart | May 29, 1900 |
| 1,407,550 | Lapp | Feb. 21, 1922 |
| 1,553,356 | Bennett | Sept. 15, 1925 |
| 1,960,045 | Batschuk et al. | May 22, 1934 |

FOREIGN PATENTS

| Number | Country | Date |
|---|---|---|
| 22,172 | Australia | Apr. 10, 1935 |
| 105,182 | Austria | Jan. 10, 1927 |